United States Patent
Khalili et al.

(10) Patent No.: US 6,477,856 B1
(45) Date of Patent: Nov. 12, 2002

(54) RECUPERATION IN SOLID-VAPOR SORPTION SYSTEM USING SORPTION ENERGY AND VAPOR MASS FLOW

(75) Inventors: Kaveh Khalili; Uwe Rockenfeller, both of Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/912,647

(22) Filed: Jul. 24, 2001

(51) Int. Cl.[7] .............................................. F25B 17/08
(52) U.S. Cl. ............................ 62/480; 62/106; 62/112
(58) Field of Search .................... 62/476, 479, 480, 62/106, 112; 165/104.15; 252/67, 69

(56) References Cited

U.S. PATENT DOCUMENTS

| | | | |
|---|---|---|---|
| 4,169,362 A | * 10/1979 | Weil et al. ..................... | 62/478 |
| 5,079,928 A | 1/1992 | Rockenfeller et al. ......... | 62/106 |
| 5,161,389 A | 11/1992 | Rockenfeller et al. ......... | 62/480 |
| 5,263,330 A | 11/1993 | Rockenfeller et al. ......... | 62/102 |
| 5,298,231 A | 3/1994 | Rockenfeller ............... | 423/299 |
| 5,320,518 A | * 6/1994 | Stilger et al. ................... | 431/7 |
| 5,328,671 A | 7/1994 | Rockenfeller ............... | 423/210 |
| 5,441,716 A | 8/1995 | Rockenfeller ............... | 423/299 |
| 5,442,931 A | * 8/1995 | Ryan et al. ................... | 62/101 |
| 5,477,706 A | 12/1995 | Kirol et al. ................... | 62/480 |
| 5,598,721 A | 2/1997 | Rockenfeller et al. ......... | 62/480 |
| 5,628,205 A | 5/1997 | Rockenfeller et al. ......... | 62/480 |

* cited by examiner

Primary Examiner—Denise L. Esquivel
Assistant Examiner—Melvin Jones
(74) Attorney, Agent, or Firm—Knobbe, Martens, Olson & Bear, LLP

(57) ABSTRACT

A method of carrying out recuperation between alternately absorbing and desorbing reactors in which in a first reaction cycle in a desorbing reactor a gaseous reactant is desorbed from a solid sorbent and concurrently in an absorbing-reactor the gaseous reactant is absorbed on a solid sorbent, and in a second reaction cycle, absorption and desorption are reversed in said reactors, respectively, comprising communicating the reaction chambers of the desorbing reactor with the reaction chamber of the absorbing reactor and directing a portion of gaseous reactant desorbed from the sorbent composition in the desorbing reactor near the completion of a desorbing cycle to the absorbing reactor for less than about 10 minutes prior to reversing the cycles.

20 Claims, 1 Drawing Sheet

RECUPERATION IN SOLID-VAPOR SORPTION SYSTEM USING SORPTION ENERGY AND VAPOR MASS FLOW

BACKGROUND OF THE INVENTION

In solid-vapor sorption reaction systems, a gaseous reactant is alternately absorbed and desorbed on a solid sorbent in one or more reaction chambers in a sorber or reactor. Where two reactors or banks of reactors are used, the system is operated in substantially opposing phases or half-cycles with one reactor or bank of reactors desorbing the gaseous reactant from the solid sorbent while the other reactor or bank of reactors is absorbing the gaseous reactant on the solid sorbent. The desorbed gaseous reactant or refrigerant vapor is directed to one or more condensers and after condensation is directed to one or more evaporators where it is vaporized. Heat may be recovered from the condenser and cooling from the evaporator. In other systems, reactors are used instead of condensers and evaporators for recovering energy from the refrigerant. Desorption is carried out by heating the solid sorbent, on which the gaseous reactant has been absorbed. Electric, steam, or gas-driven heaters are typically used for heating the solid sorbent, and/or heat transfer fluid is directed through a reactor heat exchanger to which the sorbent is thermally exposed. To initiate absorption a solid sorbent, from which the gaseous reactant or refrigerant has been desorbed, is cooled to a suitable temperature whereby it draws the gaseous refrigerant from the evaporator. The reactors may also be provided with heat exchangers and piping for directing heat transfer fluid between the reactors whereby heat released from an absorbing reactor is directed to a desorbing reactor to provide heating to carry out desorption. Such systems, apparatus and methods for their operation are well known in the art and are disclosed, for example, in U.S. Pat. Nos. 5,079,928, 5,263,330, 5,477,706, 5,598,721, and 5,628,205, all of which disclosures are incorporated herein by reference.

During a reaction cycle, an absorbing reactor is at a lower temperature than the desorbing reactor, i.e., the temperature of the solid sorbent and all other components within the desorbing reactor is higher than the temperature of the solid sorbent and all other components in the absorbing reactor. At the end of a half-cycle, with a majority of gaseous reactant desorbed from the sorbent in the desorbing reactor and a majority of gaseous reactant absorbed on the sorbent in the absorbing reactor, the absorption/desorption phases are reversed. At this half-point of the cycle, the desorbing reactor must be cooled and the absorbing reactor must be heated. At least partial heating of the desorbing reactor may be supplied by directing heat of absorption from the absorbing reactor, in the previous half-cycle, to the desorbing reactor, such as disclosed in the aforesaid patents. Cooling of the absorbing reactor may be accomplished utilizing a portion of the condensed refrigerant to the heat exchange section of the absorbing reactor. Such cooling may be assisted by utilizing vaporized heat transfer fluid or refrigerant for driving the liquid heat transfer fluid or refrigerant in the cooling: loop, such as disclosed in U.S. Pat. No. 5,477,706. However, because of the substantial differential temperature between the higher temperature desorbing reactor and the lower temperature absorbing reactor, at the end of the half-cycle, substantial energy is required to elevate the temperature of the reactor in which absorption has just been completed sufficiently to initiate desorption. This energy requirement substantially penalizes the overall efficiency of the system and requires hardware and components such as heaters, thermostats, piping, heat exchangers, multiple condensers or condenser sections, etc. to effectively and rapidly switch the reactor half-cycles. Such components significantly increase the cost and size of the sorption systems.

SUMMARY OF THE INVENTION

The present invention comprises a method and apparatus for providing recuperation between two opposing sorbers or opposing banks of sorbers in a single or multiple-stage solid-vapor sorption system utilizing the sorption energy that exists between the reactors. The method utilizes a mass-fraction of remaining absorbed vapor on the sorbent in the desorbing reactor near the completion of a half-cycle, prior to reversing the phases. The method is carried out by utilizing piping between the reaction chambers of the opposing reactors and one or more valves for opening and closing the pipe or pipes whereby the timing of the recuperation may be selected and controlled to achieve the desired energy transfer.

DETAILED DESCRIPTION OF THE PREFERRED EMBODIMENT

As used herein, the term "compound" and "solid sorbent composition" is intended to mean any reaction product formed by absorption or adsorption and desorption of a gaseous reactant on a solid reactant, i.e., chemisorption, within the scope of the invention. "Absorption" and "adsorption" may be used interchangeably. A reactor or sorber, within the scope of intended apparatus, includes a reaction chamber containing the solid sorbent and heat exchange components including piping for directing heat transfer fluids to and from the reactor in contact with the sorbent, as well as resistive heating elements, and the like. Examples of such reactors are disclosed in the aforesaid U.S. patents, particularly U.S. Pat. Nos. 5,298,231, 5,328,671, and 5,477,706.

As described in the aforesaid patents, after each half-cycle in which one or more first reactors or bank of reactors has completed absorption, and the other opposing second reactor or bank of reactors has completed desorption the cycles are reversed. It is to recuperation of energy between opposing reactors at the end of these opposing cycles that the present invention is directed. During the recuperation, a portion or mass-fraction of the remaining absorbed gaseous reactant from the one or more desorbing reactors is directed to the opposing reactor or reactors where absorption is to occur in the next half-cycle or phase. To achieve such recuperation, the reaction chambers of the opposing reactors are placed in communication or open to one another. This is accomplished by providing piping between the opposing reaction chambers together with cooperating valve or valving components whereby communication between the opposing reactors is selected as is the timing which includes the sequencing and duration of the communication period during which the recuperation is carried out. During the recuperation two or more sorbers which are connected via piping and valve(s) are open to each other. This results in mass transfer from the high-temperature sorber(s) to the low-temperature sorber(s), during which, due to exothermic and endothermic reactions, temperature of the high-temperature sorber is reduced and temperature of the low-temperature sorber is increased.

Figure 1:
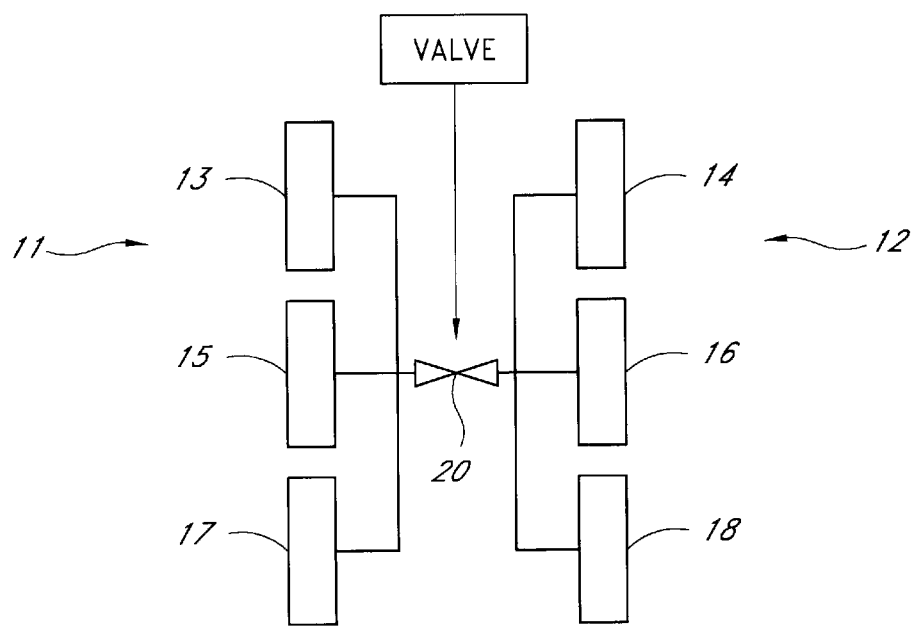
FIG. 1 is a schematic illustration of two opposing banks of reactors illustrating the piping and valve for reactor recuperation according to the invention.

FIG. 1 schematically illustrates a plurality of reactors which are connected through appropriate piping to carry out the recuperation according to the invention. A first bank of reactors 11 comprises reactors 13, 15 and 17 and a second bank of reactors 12 comprises reactors 14, 16 and 18. The number of reactors in each bank is simply illustrative and one or more any number of reactors in each bank of reactors may be used. Appropriate piping for connecting each bank of reactors is illustrated with valve 20 positioned in the recuperation line or piping through which the first and second bank of reactors are connected. The valve will typically include suitable components for operating the valve for the desired duration and at appropriate times between the cycle or phase reversal period. Such valving and components are not part of the invention, and are well known to those skilled in the art as are cycle time periods.

In chemisorption reactions, desorption is carried out at relatively high pressure and temperature while absorption is carried out at relatively low pressure and temperature. Because of the high-pressure difference between opposing absorption and desorption reactors, the time or duration required for the recuperation process is relatively short. The initiation of the recuperation during the cycle is carried out near the completion of the cycle where the remaining mass of gaseous reactant or refrigerant vapor desorbed from the solids sorbent is not usually used for producing refrigeration/cooling because of pressure and/or efficiency limitations. The recuperation is carried out near the completion of a cycle for less than about 10 minutes prior to reversing the cycles, preferably less than about 5 minutes, and more preferably less than about 3 minutes prior to reversing the cycles. The duration of the recuperation is preferably carried out for a time sufficient to yield a temperature change between a desorbing and absorbing reactor of at least about 15° C. In a chemisorption reaction process, the desorbing reaction temperature for a specific sorbent composition is higher than the absorption temperature of the same sorbent composition. Specific examples of absorption and desorption temperatures for a number of ammoniated complex compounds are disclosed in the tables of U.S. Pat. No. 5,079,928, the description of which are incorporated herein by reference. Temperature differentials for absorbing and desorbing compositions are well known to those skilled in the art. The temperature differential between an absorbing and desorbing reactant is referred to as $\Delta T$. Preferably the recuperation is carried out for a time sufficient to yield a temperature change of at least about 10% $\Delta T$, more preferably at least 50% $\Delta T$ and most preferably at least 70% $\Delta T$. The time required to accomplish such recuperation is usually between about 1 and about 3 minutes due to the high pressure differential between the sorbers resulting in high reactivity and mass flow rate of vapor between the sorbers. By using the recuperation process described herein, a desorbing reactor is benefited by temperature reduction whereby less cool-down is needed to achieve a temperature required for absorption, and an absorbing reactor is benefited by the temperature increase thereby reducing the amount of heating required for desorption. Thus, desorbing and absorbing reactors are respectively benefited as is the overall efficiency of the system.

Solid reactants suitable for forming the solid sorbent compositions useful in the present invention include absorbents such as metal oxides, sulfides, sulfates and metal hydrides, and zeolites, activated carbon, activated alumina, and silica gel. Such absorbents may be reacted with polar or non-polar gaseous reactants. Suitable non-polar gaseous reactants include natural gas $C_1$–$C_6$ lower alkanes (e.g., methane, ethane, propane, etc.), cryogenic refrigerants (helium, argon and hydrogen), environmental gases (oxygen, nitrogen, hydrogen, $NO_x$, $CO_2$ and CO) and the fluorocarbon CFC, HCFC and HFC refrigerants. Of the aforesaid, preferred systems use zeolites or activated carbon with fluorocarbons or polar gas refrigerants water or ammonia, or a metal hydride with hydrogen. However, the preferred solid sorbent compositions are the complex compounds formed between an inorganic metal salt and a polar gas refrigerant. Adsorption of the polar gas on the salt is carried out in a chemisorption reaction to yield the complex compound. Preferred metal salts are selected from alkali and alkaline earth metals, transition metals, aluminum, zinc, cadmium and tin. Preferred transition metals are manganese, iron, nickel and cobalt. Preferred metal salts include nitrates, nitrites, perchlorates, oxalates, sulfates, sulfites, and halides, particularly chlorides, bromides and iodides of the metals. Preferred polar gases include ammonia, water, methylamine and ethanol, ammonia being especially preferred. Other suitable polar refrigerants include sulfur dioxide, lower alkanols, alkylamines, polyamines and phosphine. These as well as other suitable and preferred reactants and resulting complex compounds are disclosed in the aforesaid patents, particularly U.S. Pat. Nos. 5,441,716 and 5,628,205, incorporated herein by reference. Particularly preferred systems are opposing reactors or banks or series of reactors incorporating one or more of the following complex compounds:

$BaCl_2.0$–$8(NH_3)$, $SrCl_2.1$–$8(NH_3)$, $SrBr_2.2$–$8(NH_3)$, $CaCl_2.0$–$1(NH_3)$, $CaCl_2.1$–$2(NH_3)$, $CaCl_2.2$–$4(NH_3)$, $CaCl_2.4$–$8(NH_3)$, $CaBr_2.2$–$6(NH_3)$, $NiCl_2.2$–$6(NH_3)$, $FeCl_2.2$–$6(NH_3)$ $FeBr_2.2$–$6(NH_3)$, $CoCl_2.2$–$6(NH_3)$, $CoBr_2.2$–$6(NH_3)$, $MgCl_2.2$–$6(NH_3)$, $MgBr_2.2$–$6(NH_3)$ $MnCl_2.2$–$6(NH_3)$, $MnBr_2.2$–$6(NH_3)$, $CuSO_2.2$–$6(NH_3)$, $ZnCl_2.1$–$4(NH_3)$, $NaBF_4.0$–$3(NH_3)$ and $LiCl.1$–$3(NH_3)$.

A system of opposing and alternately absorbing and desorbing gaseous reactants on the solid sorbent compositions may also include staged reactors such as described in U.S. Pat. Nos. 5,079,928 and 5,263,330. In addition, pairs or banks of opposing stage reactors may also be used. In such multiple-staged compound systems, as well as the single-staged systems, it is advantageous to include heat exchange loop plumbing for directing heat transfer fluid or fluids between the reactors to take advantage of the $\Delta T$ between absorbing and desorbing reactors using such staging for cooling a desorbed reactor to a lower temperature in order to initiate absorption, and to assist in heating an absorbed reactor prior to initiating desorption, further increases the efficiency of the system. However, the present invention may substitute, complement, or replace heating and cooling heat exchange hardware and components used in the previously described systems and known in the art and which use pumped flow or phase-change fluids and require complex piping and other components, whereby the size and cost of the absorption system and its operation may be significantly reduced.

Figure 2:
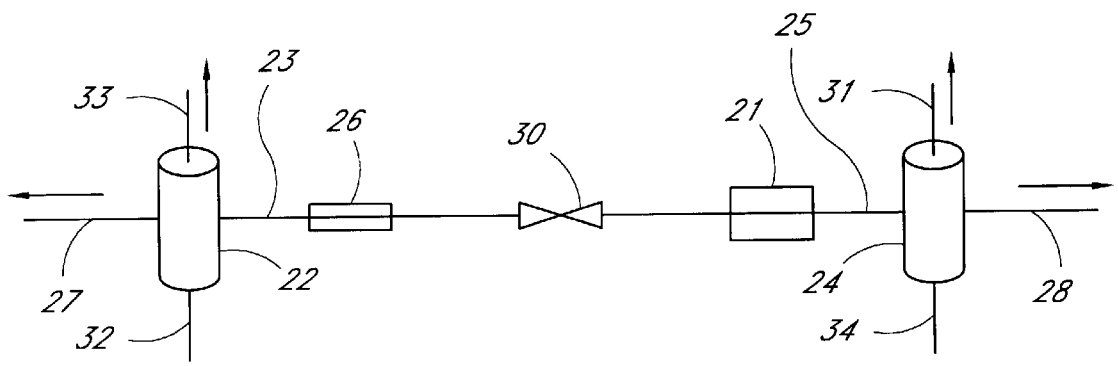
FIG. 2 is a schematic illustration of a two-sorber system illustrating the invention.

An example of a system according to the invention is schematically illustrated in FIG. 2. The illustrated apparatus includes a first reactor 22 and second reactor 24 with the reaction chambers of the respective reactors communicating via recuperation line conduits 23 and 25, with the timing or sequencing and duration of the communication controlled by a solenoid valve 30. A flow meter 21 is located along conduit 25 and pressure transducer along conduit 23. Heat transfer fluid is directed into the heat exchange component of reactor 24 via pipe 34 and from the reactor via pipe 31. Similarly, pipes 32 and 33 direct heat transfer fluid to and from reactor 22, respectively. Pipe 27 directs refrigerant vapor desorbed from reactor 22 to a system condenser or energy recovering reactor (not shown) and may be used for returning refrigerant vapor from a system evaporator or reactor (not shown) to the reactor 22. Similarly, pipe 28 is used for directing refrigerant vapor to and from reactor 24. Solenoid valve 30 is used for opening and closing the recuperation line during the recuperation process as previously described.

By way of example, in such an apparatus, the two reactors were supplied with $CaBr_2$, and ammonia was adsorbed on the salt to provide a complex compound for adsorption and desorption between the coordination steps $CaBr_2.2-6$. Both sorbers were heated and cooled, respectively, using Syltherm XL™ heat transfer fluid. The system was run for half-cycle absorption/desorption periods of 10, 15 and 20 minutes. Between each half-cycle the solenoid valve was opened for less than 2 minutes, during which time recuperation was completed. The absorption and desorption temperatures and pressures utilized are known to those skilled in the art.

Typically, chemisorption reaction cycles are carried out with absorption and desorption reactions running substantially concurrently. However, the process of the invention may also be used in systems having multiple reactors or multiple banks of reactors which are intentionally programmed to operate out of phase. Such operation may be especially useful in a system designed for continuous cooling and/or freezing wherein desorption is desirably carried out more rapidly than absorption, such as described in U.S. Pat. No. 5,628,205. In such applications, any desorbing reactor in which desorption is almost completed may be coupled with an absorbing reactor benefiting from such gaseous refrigerant transfer and/or an almost completed absorbing reactor may be coupled with a benefiting desorbing reactor. The timing of the absorption and desorption half-cycles, whether operating substantially concurrently and in phase or out of phase and for opening and closing the valve or valves for carrying out the recuperation described herein may be controlled by a microprocessor/controller programmed for carrying out selected timing or using other equivalent apparatus and means known to those skilled in the art. Thus, a system as described above may include appropriate hardware components including valves, piping, temperature, pressure and/or flow sensors and control apparatus as well as software needed or desired for carrying out the recuperation process of the invention. Other uses of the invention in solid-gas absorption systems as described and incorporated herein will be evident to those skilled in the art.

What is claimed is:

1. In a chemisorption reaction process comprising alternately absorbing and desorbing a gaseous reactant on a solid sorbent composition at different temperatures, respectively, utilizing two or more reactors, wherein in a first reaction cycle in one or more first reactors the gaseous reactant is desorbed from a solid sorbent and directed to one or more condensers or other sorbers, and in one or more second reactors the gaseous reactant is absorbed on a solid sorbent, and in a second reaction cycle, absorption and desorption are reversed in said one or more first and one or more second reactors, respectively, a method of recuperation between the one or more first and one or more second reactors comprising directing a portion of gaseous reactant desorbed from the sorbent composition in a desorbing reactor near the completion of a desorption phase to the absorbing reactor for less than about 10 minutes prior to reversing the cycles.

2. A method of carrying out recuperation between alternately absorbing and desorbing reactors in which in a first reaction cycle in a desorbing reactor a gaseous reactant is desorbed from a solid sorbent and-in an absorbing reactor the gaseous reactant is absorbed on a solid sorbent, and in a second reaction cycle, absorption and desorption are reversed in said reactors, respectively, comprising, near the completion of a reaction cycle, communicating the reaction chamber of a desorbing reactor with the reaction chamber of an absorbing reactor and directing a portion of gaseous reactant desorbed from the sorbent composition in the desorbing reactor to the absorbing reactor for less than about 10 minutes prior to reversing the cycles.

3. A method of claim 1 or 2 wherein said recuperation is carried out in less than about 5 minutes prior to reversing the cycles.

4. A method of claim 1 or 2 wherein said recuperation is carried out in less than about 3 minutes prior to reversing the cycles.

5. A method of claim 1 or 2 wherein said recuperation is carried out for a time sufficient to yield a temperature change between an absorbing and a desorbing reactor of at least about 15° C.

6. A method of claim 1 or 2 wherein reaction chamber temperature differential between a desorbing reactor and an absorbing reactor is $\Delta T$ and wherein the recuperation is carried out for a time sufficient to yield a temperature change of at least 10% $\Delta T$.

7. A method of claim 1 or 2 wherein sufficient sorption energy is transferred from the desorbing reactor to the absorbing reactor to yield a temperature change between the reactors of at least 10% of the temperature differential between the respective reactors during a first or second reaction cycle, prior to initiating recuperation.

8. A method of claim 1 or 2 wherein said absorption and said desorption reactions are carried out substantially concurrently in said reaction cycles.

9. A method of claim 1 or 2 wherein said absorption and said desorption reactions are operated out of phase.

10. A method of claim 9 wherein the reaction cycles are carried out so that the desorption reaction occurs more rapidly than the absorption reaction.

11. An apparatus for carrying out the method of claim 1 or 2 comprising a plurality of reactors, each reactor having a reaction chamber containing a solid sorbent capable of alternately absorbing and desorbing a gaseous reactant, said apparatus having piping and one or more valves cooperating therewith for directing gaseous reactant from the reaction chamber of a desorbing reactor to the reaction chamber of an absorbing reactor.

12. An apparatus of claim 11 wherein said solid absorbent comprises a complex compound formed by absorbing ammonia on a metal salt and selected from the group consisting of:

$BaCl_2.0-8(NH_3)$, $SrCl_2.1-8(NH_3)$, $SrBr_2.2-8(NH_3)$, $CaCl_2.0-1(NH_3)$, $CaCl_2.1-2(NH_3)$ $CaCl_2.2-4(NH_3)$, $CaCl_2.4-8(NH_3)$, $CaBr_2.2-6(NH_3)$, $NiCl_2.2-6(NH_3)$, $FeCl_2.2-6(NH_3)$ $FeBr_2.2-6(NH_3)$, $CoCl_2.2-6(NH_3)$, $CoBr_2.2-6(NH_3)$, $MgCl_2.2-6(NH_3)$, $MgBr_2.2-6(NH_3)$ $MnCl_2.2-6(NH_3)$, $MnBr_2.2-6(NH_3)$, $CuSO_2.2-6(NH_3)$, $ZnCl_2.1-4(NH_3)$, $NaBF_4.0-3(NH_3)$ and $LiCl.1-3(NH_3)$.

13. An apparatus of claim 11 comprising one or more first reactors and one or more second reactors, and wherein the metal salt forming the complex compound of the first and second reactors is the same.

14. An apparatus of claim 12 wherein the metal salt of the complex compound in said one or more first reactors is different from the metal salt of the complex compound in said one or more second reactors, and wherein the complex compound in a first reactor has an absorption temperature at absorption pressure at least 8° C. higher than the desorption temperature of the complex compound in a second reactor at desorption pressure.

15. An apparatus of claim 11 comprising a plurality of three or more reactors, and wherein the metal salt of the complex compound in each of said plurality of reactors is different and wherein each of the compounds has a different ammonia vapor pressure, whereby the adsorption temperature of a lower vapor pressure compound at absorption pressure is at least 8° C. higher than the desorption temperature of the next successive higher vapor pressure compound at desorption pressure.

16. An apparatus of claim 11 wherein said solid sorbent comprises a zeolite, activated carbon, activated alumina or silica gel.

17. An apparatus of claim 16 wherein said gaseous reactant comprises a polar or nonpolar refrigerant.

18. An apparatus of claim 16 where said gaseous reactant comprises water, ammonia or a fluorocarbon refrigerant.

19. An apparatus of claim 11 wherein said solid sorbent comprises a metal hydride and said gaseous reactant comprises hydrogen.

20. An apparatus of claim 11 wherein said plurality of reactors comprise a plurality of banks of two or more reactors.

* * * * *